US007725314B2

(12) United States Patent
Wu et al.

(10) Patent No.: US 7,725,314 B2

(45) Date of Patent: May 25, 2010

(54) METHOD AND APPARATUS FOR CONSTRUCTING A SPEECH FILTER USING ESTIMATES OF CLEAN SPEECH AND NOISE

(75) Inventors: Jian Wu, Hong Kong (CN); James G. Droppo, Duvall, WA (US); Li Deng, Sammamish, WA (US); Alejandro Acero, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1382 days.

(21) Appl. No.: 10/780,177

(22) Filed: Feb. 16, 2004

(65) Prior Publication Data

US 2005/0182624 A1 Aug. 18, 2005

(51) Int. Cl.
*G10L 15/20* (2006.01)
*G10L 21/02* (2006.01)
*G10L 15/00* (2006.01)
*H04B 15/00* (2006.01)

(52) U.S. Cl. ....................... 704/233; 704/226; 704/227; 704/228; 704/231; 704/234; 704/236; 381/94.1; 381/94.2; 381/94.3

(58) Field of Classification Search ................. 704/233, 704/226, 227, 228, 231, 234, 236; 381/94.1–94.3
See application file for complete search history.

(56) References Cited

U.S. PATENT DOCUMENTS

| | | | | |
|---|---|---|---|---|
| 4,658,426 | A * | 4/1987 | Chabries et al. | 381/94.3 |
| 5,148,489 | A | 9/1992 | Erell et al. | 704/226 |
| 5,400,409 | A * | 3/1995 | Linhard | 381/92 |
| 5,706,395 | A * | 1/1998 | Arslan et al. | 704/226 |
| 5,768,473 | A * | 6/1998 | Eatwell et al. | 704/226 |
| 5,812,970 | A * | 9/1998 | Chan et al. | 381/94.3 |
| 5,924,065 | A | 7/1999 | Eberman et al. | 704/231 |
| 6,026,359 | A | 2/2000 | Yamaguchi et al. | 704/256 |
| 6,067,517 | A | 5/2000 | Bahl et al. | 704/256 |
| 6,188,976 | B1 | 2/2001 | Ramaswamy et al. | 704/9 |
| 6,202,047 | B1 | 3/2001 | Ephraim et al. | 704/256 |
| 6,351,731 | B1 * | 2/2002 | Anderson et al. | 704/233 |
| 6,363,345 | B1 * | 3/2002 | Marash et al. | 704/226 |
| 6,415,253 | B1 * | 7/2002 | Johnson | 704/210 |
| 6,445,801 | B1 * | 9/2002 | Pastor et al. | 381/94.2 |

(Continued)

OTHER PUBLICATIONS

Acero et al, “Environmental Robustness in Automatic Speech Recognition”, In IEEE International Conference on Acoustics, Speech and Signal Processing, ICASSP 90', vol. 2, Apr. 3-6, 1990, pp. 849-852.*

(Continued)

*Primary Examiner*—David R Hudspeth
*Assistant Examiner*—Paras Shah
(74) *Attorney, Agent, or Firm*—Theodore M. Magee; Westman, Champlin & Kelly, P.A.

(57) ABSTRACT

A method and apparatus identify a clean speech signal from a noisy speech signal. To do this, a clean speech value and a noise value are estimated from the noisy speech signal. The clean speech value and the noise value are then used to define a gain on a filter. The noisy speech signal is applied to the filter to produce the clean speech signal. Under some embodiments, the noise value and the clean speech value are used in both the numerator and the denominator of the filter gain, with the numerator being guaranteed to be positive.

4 Claims, 5 Drawing Sheets

U.S. PATENT DOCUMENTS

| | | | | |
|---|---|---|---|---|
| 6,477,489 | B1 * | 11/2002 | Lockwood et al. | 704/200.1 |
| 6,633,842 | B1 | 10/2003 | Gong | 704/233 |
| 6,766,292 | B1 * | 7/2004 | Chandran et al. | 704/224 |
| 7,133,828 | B2 * | 11/2006 | Scarano et al. | 704/251 |
| 7,158,932 | B1 * | 1/2007 | Furuta | 704/226 |
| 7,177,805 | B1 * | 2/2007 | Oh et al. | 704/225 |
| 7,428,490 | B2 * | 9/2008 | Xu et al. | 704/226 |
| 2002/0002455 | A1 * | 1/2002 | Accardi et al. | 704/226 |
| 2003/0033139 | A1 * | 2/2003 | Walker | 704/210 |
| 2004/0186710 | A1 * | 9/2004 | Yang | 704/226 |

OTHER PUBLICATIONS

Kim, Young Joon / Kim, Hyun Woo / Lim, Woohyung / Kim, Nam Soo (2003): "Feature compensation technique for robust speech recognition in noisy environments", In Eurospeech-2003, 357-360.*

Deng, J. Droppo, and A. Acero, "Log-domain speech featureenhancement using sequential MAP noise estimation and a phase-sensitive model of the acoustic environment," in Proc. ICSLP,2002, pp. 1813-1816.*

U.S. Appl. No. 09/999,576, filed Nov. 15, 2001, Attias et al.

U.S. Appl. No. 10/772,937, filed Nov. 26, 2003, Kristjansson et al.

U.S. Appl. No. 09/812,524, filed Mar. 20, 2001, Acero et al.

Agarwal, A., et al., "Two-Stage Mel-Warped Wiener Filter for Robust Speech Recognition," Proceeding IEEE-ASRU Workshop 1999.

Deng, L., et al., "Recursive Noise Estimation Using Iterative Stochastic Approximation for Stereo-Based Robust Speech Recognition," Proceeding IEEE ASRU Workshop 2001, Italy.

Deng, L., et al., "Incremental Bayes Learning with Prior Evolution for Tracking Nonstationary Noise Statistics from Noisy Speech Data," Proceeding IEEE ICASSP 2003, Hong Kong, China.

Frey, B.J., et al., "Algonquin: Iterating Laplace's Method to Remove Multiple Types of Acoustic Distortion for Robust Speech Recognition," Proceeding Eurospeech 2001.

Kristjansson, T., et al., "Joint Estimation of Noise and Channel Distortion in a Generalized EM Framework," Proceeding IEEE ASRU Workshop 2001, Italy.

Sanka, A., et al., "A Maximum-Likelihood Approach to Stochastic Matching for Robust Speech Recognition," IEEE Translation on Speech and Audio Processing, vol. 4, No. 3, pp. 190-202, 1996.

Y. Ephraim, "Gain-Adaptive HMMs for Recongition of Clean and Noisy Speech," IEEE Trans, Signal Processing, vol. 40, Jun. 1992, pp. 1303-1316.

A.P. Varga and R.K. Moore, "Hidden Markov Model Decomposition of Speech and Noise," in Proceedings of the International Conference on Acoustics, Speech and Signal Processing, IEEE Press., pp. 845-848 (1990).

S. Boll, "Suppression of Acoustic Noise in Speech Using Spectral Subtraction," IEEE Transactions on Acoustics, Speech and Signal Processing, vol. 27, pp. 114-120 (1979).

L. Deng, A. Acero, M. Plumpe & X.D. Huang, "Large-Vocabulary Speech Recognition Under Adverse Acoustic Environments," in Proceedings of the International Conference on Spoken Language Processing, pp. 806-809 (Oct. 2000).

A. Acero, L. Deng, T. Kristjansson and J. Zhang, "HMM Adaptation Using Vector Taylor Series for Noisy Speech Recognition," in Proceedings of the International Conference on Spoken Language Processing, pp. 869-872 (Oct. 2000).

Y. Ephraim, "Statistical-Model-Based Speech Enhancement Systems," Proc. IEEE, 80(10):1526-1555 (1992).

M.S. Brandstein, "On the Use of Explicit Speech Modeling in Microphone Array Application," In Proc. ICASSP, pp. 3613-3616 (1998).

A. Dembo and O. Zeitouni, "Maximum A Posteriori Estimation of Time-Varying ARMA Processes from Noisy Observations," IEEE Trans. Acoustics, Speech and Signal Processing, 36(4): 471-476 (1988).

P. Moreno, "Speech Recognition in Noisy Environments," Carnegie Mellon University, Pittsburgh, PA, pp. 1-130 (1996).

Y. Ephraim and R. Gray, "A Unified Approach for Encoding Clean and Noisy Sources by Means of Waveform and Autoregressive Model Vector Quantization," IEEE Transactions on Information Theory, vol. 34, No. 4, pp. 826-834 (Jul. 1988).

Y. Ephraim, "A Bayesian Estimation Approach for Speech Enhancement Using Hidden Markov Models," IEEE Transactions on Signal Processing, vol. 40, No. 4, pp. 725-735 (Apr. 1992).

"Noise Reduction" downloaded from http://www.ind.rwth-aachen.de/research/noise_reduction.html, pp. 1-11 (Oct. 3, 2001).

A. Acero, "Acoustical and Environmental Robustness in Automatic Speech Recognition," Department of Electrical and Computer Engineering, pp. 1-141 (Sep. 13, 1990).

Frey, Variational Inference and Learning in Graphical Models (undated).

R. Neal and G. Hinton, "A View of the EM Algorithm that Justifies Incremental, Sparse, and Other Variants," pp. 1-14 (1993).

J. Lim and A. Oppenheim, "All-Pole Modeling of Degraded Speech," IEEE Transactions on Acoustics, Speech, and Signal Processing, vol. ASSP-26, No. 3, pp. 197-210 (Jun. 1978).

M. Seltzer, J. Droppo, and A. Acero, "A Harmonic-Model-Based Front End for Robust Speech Recognition," *Eurospeech*, 2003.

J. Tabrikian, S. Dubnov, and Y. Dickalov, "Speech Enhancement by Harmonic Modeling Via Map Pitch Tracking," *In Proc. of ICASSP*, pp. 549-552, 2002.

B.J. Frey, T. Kristjansson, L. Deng, and A. Acero, "Learning Dynamic Noise Models from Noisy Speech for Robust Speech Recognition," *Advances in Neural Information Processing* (*NIPS*), 2001.

T. Kristjansson, *Speech Recognition in Adverse Environments: A Probabilistic Approach*, Ph.D. thesis, University of Waterloo, Ontario, Canada, Apr. 2002.

* cited by examiner

METHOD AND APPARATUS FOR CONSTRUCTING A SPEECH FILTER USING ESTIMATES OF CLEAN SPEECH AND NOISE

BACKGROUND OF THE INVENTION

The present invention relates to speech processing. In particular, the present invention relates to speech enhancement.

In speech recognition, it is common to enhance the speech signal by removing noise before performing speech recognition. Under some systems, this is done by estimating the noise in the speech signal and subtracting the noise from the noisy speech signal. This technique is typically referred to as spectral subtraction because it is performed in the spectral domain.

Since it is impossible to estimate the noise in a speech signal perfectly, any estimate that is used in spectral subtraction will have some amount of error. Because of this error, it is possible that the estimate of the noise in the noisy speech signal will be larger than the noisy speech signal for some frames of the signal. This would produce a negative value for the "clean" speech, which is physically impossible.

To avoid this, spectral subtraction systems rely on a set of parameters that are set by hand to allow for maximum noise reduction while ensuring a stable system. Relying on such parameters is undesirable since they are typically noise-source dependent and thus must be hand-tuned for each type of noise-source.

Other systems attempt to enhance the speech signal using a Wiener filter to filter out the noise in the speech signal. In such systems, the gain of the Wiener filter is generally based on a signal-to-noise ratio. To arrive at the proper gain value, the level of the noise in the signal must be determined.

One common technique for determining the level of noise is to estimate the noise during non-speech segments in the speech signal. This technique is less than desirable because it not only requires a correct estimate of the noise during the non-speech segments, it also requires that the non-speech segments be properly identified as not containing speech. In addition, this technique depends on the noise being stationary (non-changing). If the noise is changing over time, the estimate of the noise will be wrong and the filter will not perform properly.

Another system for enhancing speech attempts to identify a clean speech signal using a probabilistic framework that provides a Minimum Mean Square Error (MMSE) estimate of the clean signal given a noisy speech signal. Unfortunately, such systems can provide poor estimates of the clean speech signal at times, especially when the signal-to-noise ratio is low. As a result, using the clean speech estimates directly in speech recognition can result in poor recognition accuracy.

Thus, a system is needed that does not require as much hand-tuning of parameters as in spectral subtraction while avoiding the poor estimates that sometimes occur in MMSE estimation.

SUMMARY OF THE INVENTION

A method and apparatus identify a clean speech signal from a noisy speech signal. To do this, a clean speech value and a noise value are estimated from the noisy speech signal. The clean speech value and the noise value are then used to define a gain on a filter. The noisy speech signal is applied to the filter to produce the clean speech signal. Under some embodiments, the noise value and the clean speech value are used in both the numerator and the denominator of the filter gain, with the numerator being guaranteed to be positive.

DETAILED DESCRIPTION OF ILLUSTRATIVE EMBODIMENTS

Figure 1:
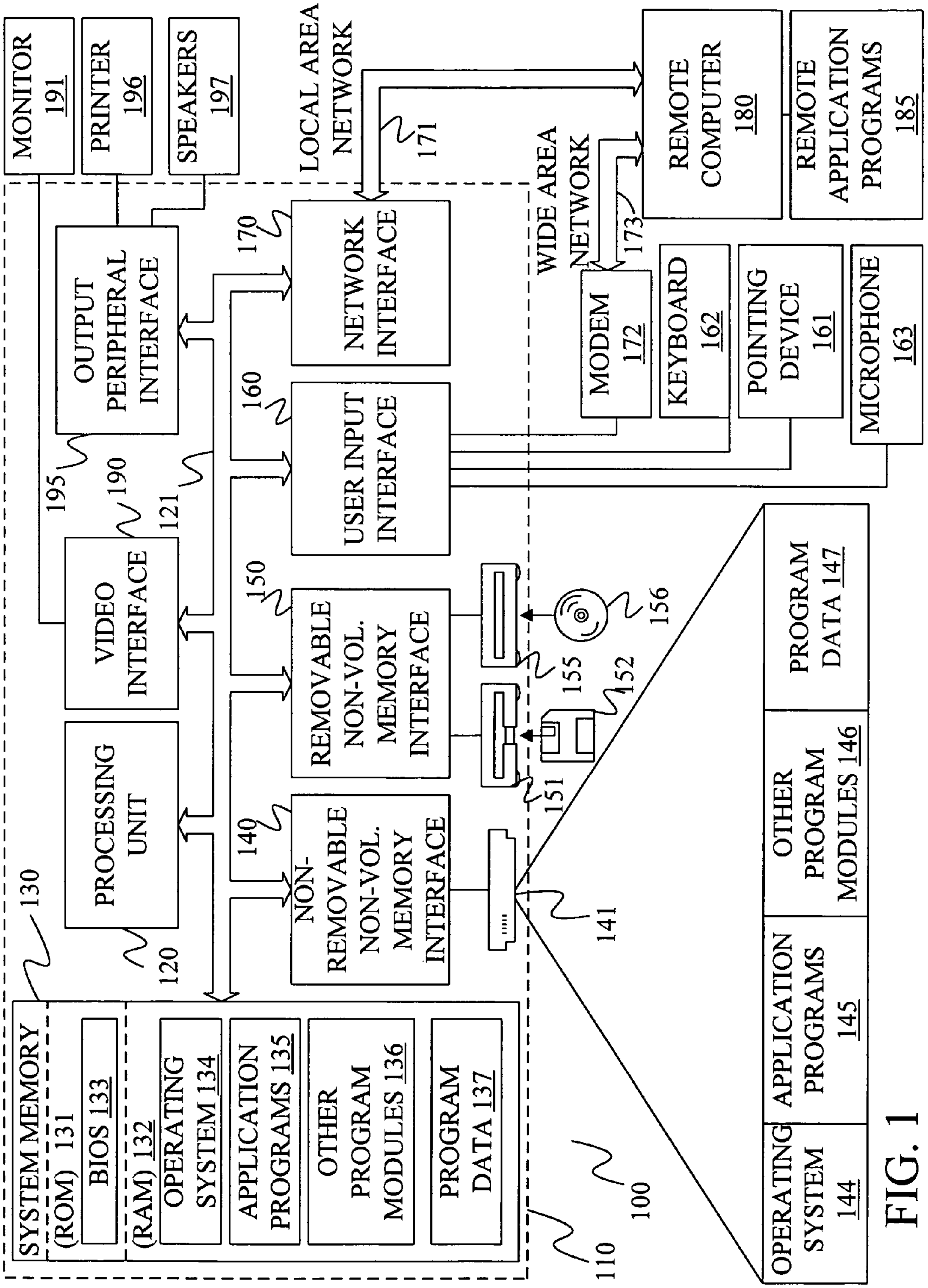
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
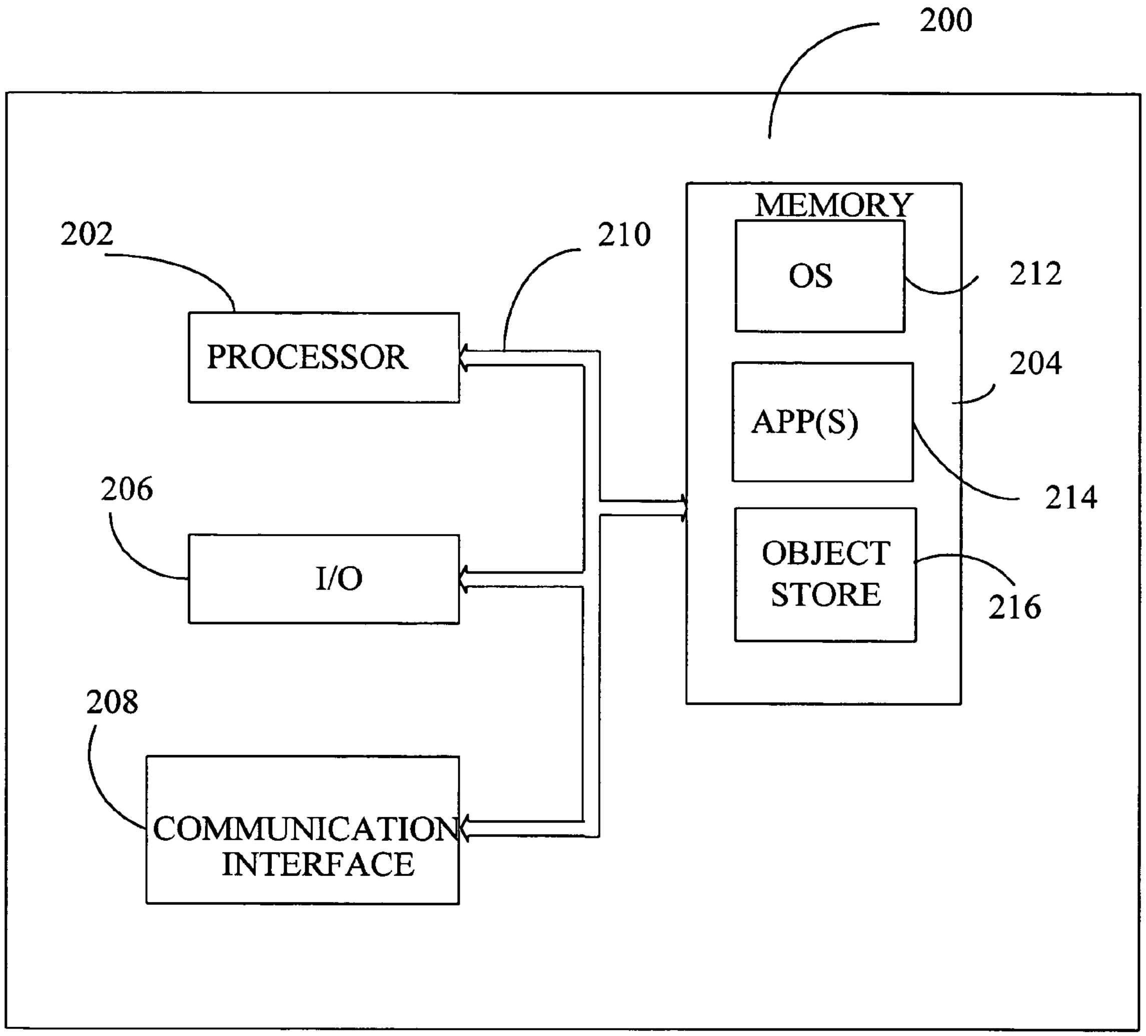
FIG. 2 is a block diagram of a mobile device in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
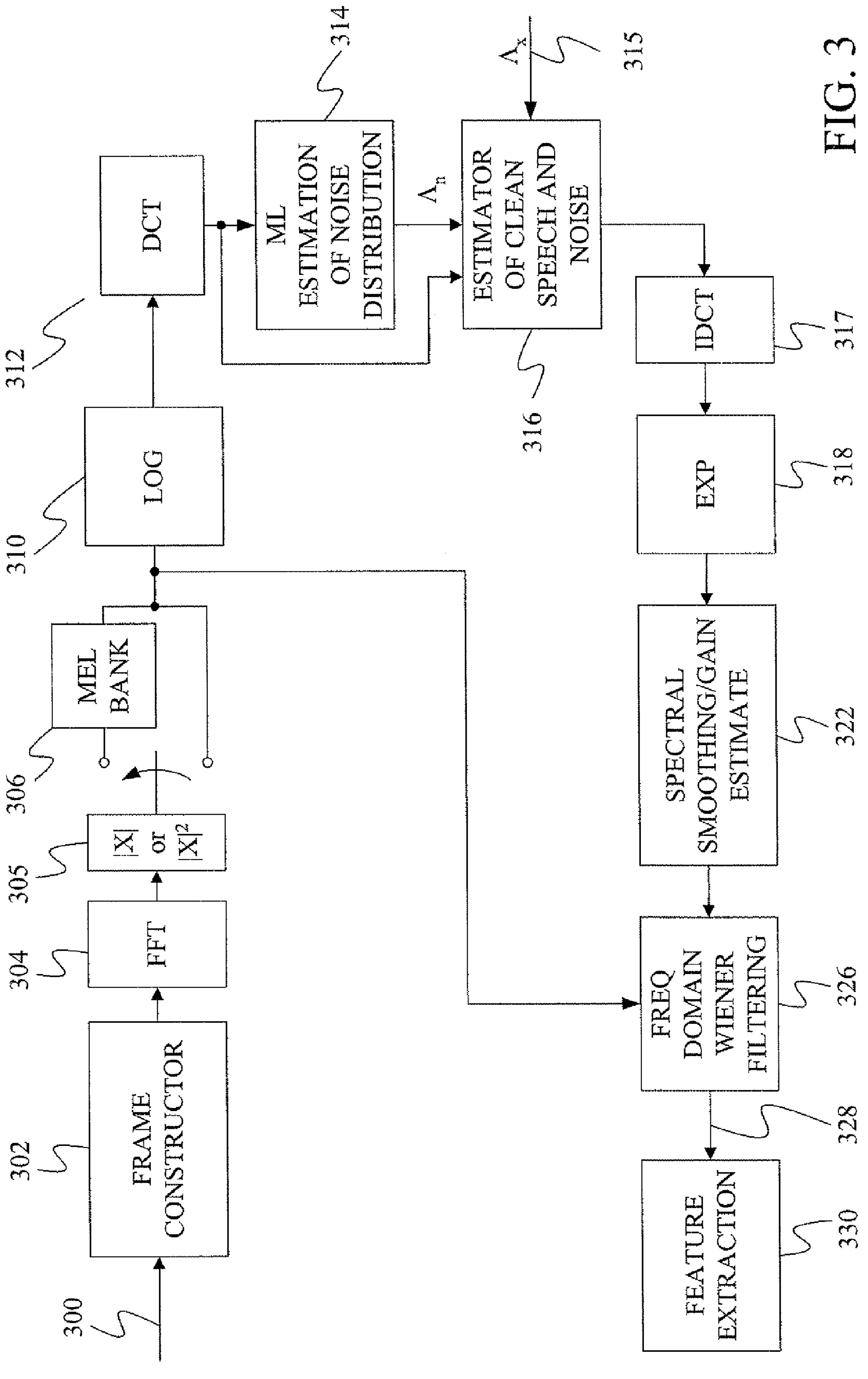
FIG. 3 is a block diagram of a speech enhancement system under one embodiment of the present invention.
Figure 4:
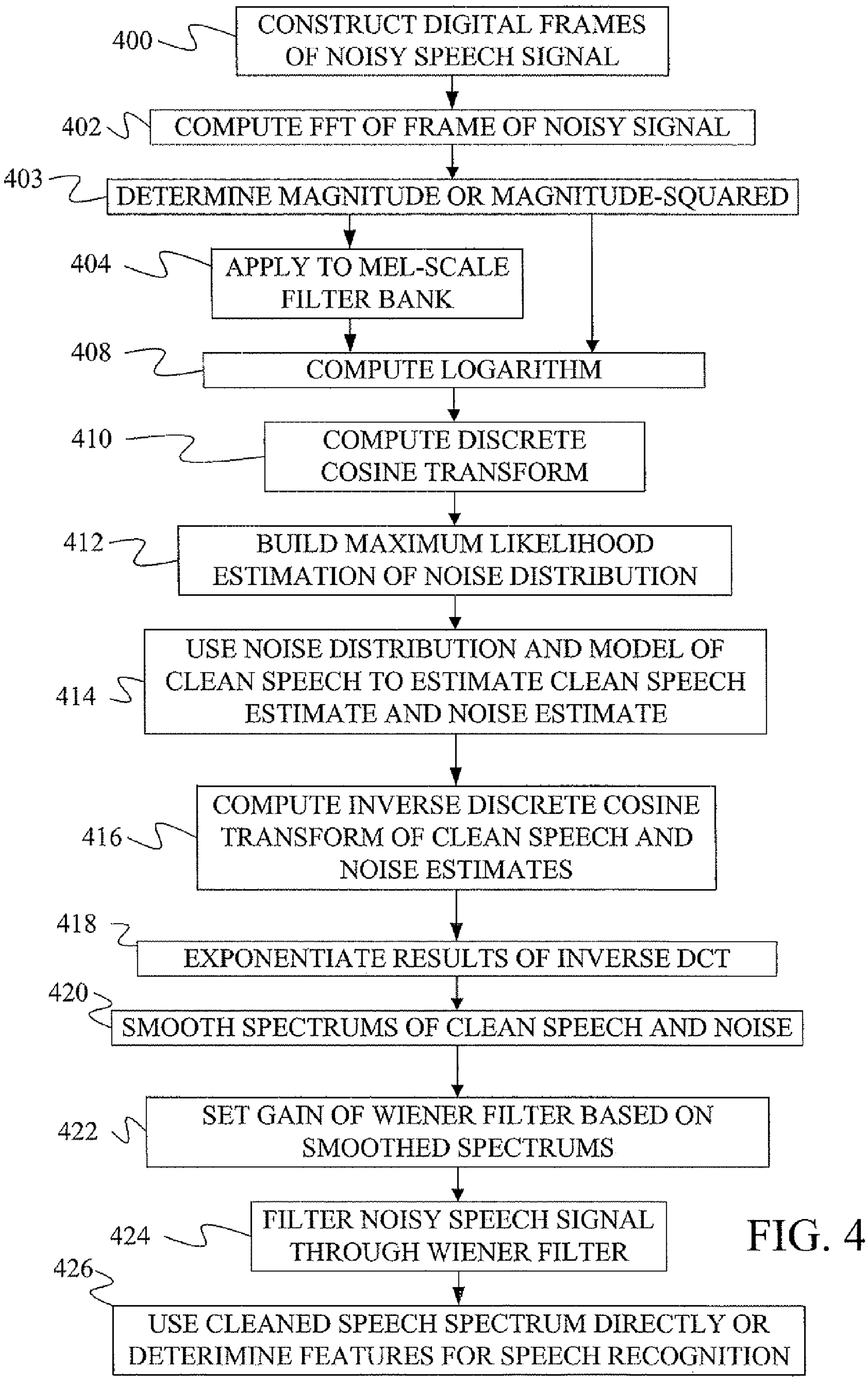
FIG. 4 is a flow diagram of a speech enhancement method under one embodiment of the present invention.

The present invention provides a method and apparatus for enhancing a speech signal. FIG. 3 provides a block diagram of the system and FIG. 4 provides a flow diagram of the method of the present invention.

At step 400, a noisy analog signal 300 is converted into a sequence of digital values that are grouped into frames by a frame constructor 302. Under one embodiment, the frames are constructed by applying analysis windows to the digital values where each analysis window is a 25 millisecond hamming window, and the centers of the windows are spaced 10 milliseconds apart.

At step 402, a frame of the digital speech signal is provided to a Fast Fourier Transform 304 to compute the phase and magnitude of a set of frequencies found in the frame. The magnitude or the square of the magnitude of each FFT is then selected/determined by block 305 at step 403.

At step 404, the magnitude values are optionally applied to a Mel-scale filter bank 306, which applies perceptual weighting to the frequency distribution and reduces the number frequency bins that are associated with the frame. The Mel-scale filter bank is an example of a frequency-based transform. In such transforms, the level of filtering applied to a frequency is based on the identity of the frequency or the magnitudes of the frequencies are scaled and combined to form fewer parameters. Thus, in FIG. 3, if the frequency values are not applied to the Mel-scale filter bank, they are not applied to a frequency-based transform.

A log function 310 is applied to the values from magnitude block 305 or Mel-Scale filter bank 306 (if the filter bank is used) at step 408 to compute the logarithm of each frequency magnitude.

At step 410, the logarithms of each frequency are applied to a discrete cosine transform (DCT) 312 to form a set of values that are represented as an observation feature vector. If the Mel-scale filter bank was used, the observation vector is referred to as a Mel-Frequency Cepstral Coefficient (MFCC) vector. If the Mel-scale filter bank was not used, the observation vector is referred to as a High Resolution Cepstral Coefficient (HRCC) vector, since it retains all of the frequency information from the input signal.

The observation feature vector is applied to a maximum likelihood (ML) estimation block 314 at step 412. ML estimation block 314 builds a maximum likelihood estimation of a noise model based on a sequence of observation feature vectors that represent an utterance, typically a sentence. Under one embodiment, this noise model is a single Gaussian distribution that is described by its mean and covariance.

The noise model and the observation feature vectors are provided to a clean speech and noise estimator 316 together with parameters 315 that describe a prior clean speech model. Under one embodiment the prior clean speech model is a Gaussian Mixture Model that is defined by a mixture weight, a mean, and a covariance for each of a set of mixture components. Using the model parameters for the clean speech and the noise, estimator 316 generates an estimate of a clean speech value and a noise value for each frame of the input speech signal at step 414. Under one embodiment, the estimates are Minimum Mean Square Error (MMSE) estimates that are computed as:

$$\hat{x}_t = \int xp(x|y_t, \Lambda_x, \Lambda_n)dx \qquad \text{EQ. 1}$$

$$\hat{n}_1 = \int np(n|y_t, \Lambda_x, \Lambda_n)dn \qquad \text{EQ. 2}$$

where $\hat{x}_t$ is the MMSE estimate of the clean speech, $\hat{n}_t$ is the MMSE estimate of the noise, x is a clean speech value, n is a noise value, $y_t$ is the observation feature vector, $\Lambda_n$ represents the parameters of the noise model, and $\Lambda_x$ represents the parameters of the clean speech model.

At steps 416, the clean speech estimate and the noise estimate, which are in the cepstral domain, are applied to an inverse discrete cosine transform 317. The results of the inverse discrete cosine transform are applied to an exponential function 318 at step 418. This produces spectral values for the clean speech estimate and the noise estimate.

At step 420, the spectral values for the clean speech estimate and the noise estimate are smoothed over time and frequency by a smoothing block 322. The smoothing over time involves smoothing each frequency value in the spectral values across different frames of the speech signal. Under one embodiment, the smoothing over frequency involves averaging values of neighboring frequency bins within a frame and placing the average value at a frequency position that is in the center of the frequency bins used to form the average value.

The smoothed spectral values for the estimate of the clean speech signal and the estimate of the noise are then used to determine the gain for a Wiener filter 326 at step 422. Under one embodiment, the gain of the Wiener filter is set as:

$$|H(t, f)| = \frac{|\hat{P}_x(t, f)|^2 + (1-\alpha)|\hat{P}_n(t, f)|^2}{|\hat{P}_x(t, f)|^2 + |\hat{P}_n(t, f)|^2} \qquad \text{EQ. 3}$$

where $|H(t, f)|$ is the gain of the Wiener filter, $|\hat{P}_x(t, f)|^2$ is the power spectrum of the clean speech estimate, $|\hat{P}_n(t, f)|^2$ is the power spectrum of the noise estimate, and $\alpha$ is factor that avoids over estimation of the noise spectra. Values for $\alpha$ vary from 0.6 to 0.95 according to the local SNR computed from the ratio of $|\hat{P}_x(t, f)|^2$ to $|\hat{P}_n(t, f)|^2$. t and f are time and frequency indices, respectively. If the Mel-Scale filter bank was used, f is the indices of the filter bank.

In Equation 3, actual estimates of the noise and clean speech are used in the denominator. In addition, the estimate of the noise in the numerator is multiplied by the factor 1-$\alpha$ such that the product is always guaranteed to be positive. This ensures that the gain will be positive regardless of the value estimated for the noise. This makes the system of the present invention much more stable than spectral subtraction systems and does not require the setting of as many parameters as spectral subtraction.

Once the filter gain has been determined at step 422, the power spectrum of the noisy frequency domain values produced by magnitude block 305 or Mel-Scale filter bank 306 is applied to the Wiener filter at step 424 to produce a filtered clean speech power spectrum. Specifically:

$$|\tilde{P}_x(t,f)|^2=|P_y(t,f)|^2\cdot|H(t,f)| \quad \text{EQ. 4}$$

where |H(t, f)| is the gain of the Wiener filter, $|\tilde{P}_x(t, f)|^2$ is the filtered clean speech power spectrum, and $|P_y(t, f)|^2$ is the power spectrum of the noisy speech signal.

At step 426, the filtered clean speech power spectrum 328 can be used to generate a clean speech signal that is to be heard by a user or it can be applied to a feature extraction unit 330, such as a Mel-Frequency Cepstral Coefficient feature extraction unit, as pre-processing for speech recognition.

Joint Model for Speech and Noise

It is assumed that the speech and noise waveforms mix linearly in the time domain. As a result of this assumption, it is common to model the noisy cepstral features y as a first order Taylor series in x and n.

$$y=A(x_0,n_0)+G(x_0,n_0)(x-x_0)+(I-G(x_0,n_0))(n-n_0)+\varepsilon \quad \text{EQ. 5}$$

$$A(x,n)=C\log(\exp(C^{-1}x)+\exp(C^{-1}n)) \quad \text{EQ. 6}$$

$$G(x,n)=C\frac{1}{\exp(C^{-1}(n-x))+1}C^{-1} \quad \text{EQ. 7}$$

The symbol I denotes the identity matrix. From now on, we will use the shorthand notation $A_0=A(x_0,n_0)$ and $G_0=G(x_0, n_0)$. In practice, it is useful to set all of the off-diagonal elements of $G_0$ to zero. This reduces computational requirements drastically, while introducing a slight increase in distortion.

Assuming the residual error term $\epsilon$ is an independent Gaussian, this induces a Gaussian probability distribution on y given x and n.

$$p(y|x,n)=N(y;\mu_y,\Sigma_{68}) \quad \text{EQ. 8}$$

$$\mu_y=A_0+G_0(x_T-x_0)+(I-G_0)(n_t-n_0) \quad \text{EQ. 9}$$

Before using this model to enhance speech, it is necessary to add a prior model for speech, $\Lambda_x$, and a prior model for noise, $\Lambda_n$. Under one embodiment of the present invention, the prior model for speech is a Gaussian mixture model, and the prior model for noise is a single Gaussian component:

$$p(x,i)=N(y;m_x(i),\Sigma_x(i))c_i \quad \text{EQ. 10}$$

$$p(n)=N(y;m_n,\Sigma_n) \quad \text{EQ. 11}$$

Finally, the joint model of noisy observation, clean speech, noise, and speech state is:

$$p(y,x,n,i|\Lambda_x,\Lambda_n)=p(y|x,n)p(x,i)p(n) \quad \text{EQ. 12}$$

The joint model of equation 12 can be manipulated to produce several formulae useful in estimating clean speech, noise, and speech state from the noisy observation.

First, the clean speech state can be inferred as:

$$p(i|y)=N(y;\mu_y(i),\Sigma_y(i)) \quad \text{EQ. 13}$$

$$\mu_y(i)=A_0+G_0(m_x(i)-x_0)+(I-G_0)(m_n-n_0) \quad \text{EQ. 14}$$

$$\Sigma_y(i)=(I-G_0)\Sigma_n(I-G_0)'+G_0\Sigma_xG_0'+\Sigma_\epsilon \quad \text{EQ. 15}$$

Second, the clean speech vector can be inferred as:

$$p(x|y,i)=N(x;\mu_{x|y}(i),\Sigma_{x|y}(i)) \quad \text{EQ. 16}$$

$$\mu_{x|y}(i)=m_x(i)+(\Sigma_y(i))^{-1}G_0\Sigma_x(i)(y-\mu_y(i)) \quad \text{EQ. 17}$$

$$\Sigma_{x|y}(i)=(\Sigma_y(i))^{-1}((I-G_0)\Sigma_n(I-G_0)'+\Sigma_\epsilon)\Sigma_x(i) \quad \text{EQ. 18}$$

Third, the noise vector can be inferred as:

$$p(n|y,i)=N(x;\mu_{n|y}(i)\Sigma_{n|y}(i)) \quad \text{EQ. 19}$$

$$\mu_{n|y}(i)=m_n+(\Sigma_y(i))^{-1}(I-G_0)\Sigma_n(y-\mu_y(i)) \quad \text{EQ. 20}$$

$$\Sigma_{n|y}(i)=(\Sigma_y(i))^{-1}(G_0\Sigma_x(i)G_0'+\Sigma_\epsilon)\Sigma_n \quad \text{EQ. 21}$$

ML Estimation of Noise Distribution

Step 412, in which a Maximum Likelihood estimate of the noise distribution is determined, involves identifying parameters, $\Lambda_n$, that maximize the joint probability $P(Y,X,N,I|\Lambda_x, \Lambda_n)$ given $y_t$ and $\Lambda_x$, where Y is the sequence of observation vectors, X is the sequence of clean speech vectors, N is the sequence of noise vectors, I is the sequence of mixture component indices, $\Lambda_x$ represents the parameters of the clean speech model, which consist of mixture component weights $c_i$, mixture component means $m_x(i)$, and mixture component covariances $\Sigma_x(i)$, and $\Lambda_n$ represents the parameters of the noise model, which consist of a mean $m_n$ and a covariance $\Sigma_n$.

Under one embodiment of the present invention, an iterative Expectation-Maximization algorithm is used to identify the parameters of the noise model. Specifically, the parameters are updated during the M-step of the EM algorithm as:

$$\hat{m}_n=\frac{\sum_t\sum_i p(i|y_t)\mu_{n|y}(i)}{\sum_t\sum_i p(i|y_t)} \quad \text{EQ. 22}$$

$$\hat{\sum_n}=\mathrm{diag}\left[\frac{\sum_t\sum_i p(i|y_t)\left[\mu_{n|y}(i)\mu_{n|y}(i)'+\sum_{n|y_1}(i)\right]}{\sum_t\sum_i p(i|y_t)}-\hat{m}_n\hat{m}_n'\right] \quad \text{EQ. 23}$$

where the notation ( )' indicates a transpose, t is a frame index, i is a mixture component index, $\hat{m}_n$ is the updated mean of the noise model, $m_n$ is the past mean of the noise model, $\hat{\Sigma}_n$ is the updated covariance of the noise model, $p(i|y_t)$ is a posterior mixture component probability (defined in equations 13-15), and $\mu_{n|y}(i)$ and $\Sigma_{n|y_t}(i)$ are a mean and covariance for a posterior distribution, defined in equations 20 and 21.

The covariance matrix, $\Sigma_\epsilon$, of the residue error can be derived with an iterative EM process by:

$$\hat{\Sigma}_{\varepsilon} = \mathrm{diag}\left[\frac{\sum_t \sum_i p(i \mid y_t) E\{\varepsilon_t \varepsilon_t' \mid y_t, i\}}{\sum_t \sum_i p(i \mid y_t)}\right] \quad \text{EQ. 24}$$

where $E\{\epsilon_t\epsilon'_t|y_t,i\}$ is the expectation of the residue error. Under one embodiment, this exact estimation is not adopted because it involves a large number of computations and because it requires stereo training data that includes both noisy speech and clean speech in order to collect training samples of the residue so that the expected value of the residue can be determined. Instead, the covariance is either set to zero or approximated as:

$$\hat{\Sigma}_{\varepsilon} \max\left(0, \Sigma_{\varepsilon} + \mathrm{diag}\left[\frac{\sum_t \sum_i p(i \mid y_t)[(y_t - \mu_y(i))(y_t - \mu_y(i))' - \Sigma_y(i)]}{\sum_t \sum_i p(i \mid y_t)}\right]\right) \quad \text{EQ. 25}$$

where the max operation ensures that the values of the matrix are non-negative. Note that equation 25 does not require stereo training data. Instead the covariance is set directly from the observation vectors.

The convergence of equations 22 and 23 becomes very slow if $\Sigma_n$ is small. Under one embodiment, this is overcome by maximizing $P(Y,I|\Lambda_x\Lambda_n)$ instead of $P(Y,X,N,I|\Lambda_x\Lambda_n)$. By setting the derivative of the corresponding auxiliary function with respect to $m_n$ to zero, the update for the mean becomes:

$$\hat{m}_n = m_n + \frac{\sum_t \sum_i p(i \mid y_t)(I - G_0)\Sigma_y^{-1}(i)(y_t - \mu_y(i))}{\sum_t \sum_i p(i \mid y_t)(I - G_0)\Sigma_y^{-1}(i)} \quad \text{EQ. 26}$$

The update for the covariance $\hat{\Sigma}_n$ remains the same as shown in Equation 23. Note that in Equation 26, the covariance of the noise model $\Sigma_n$ has been removed from the numerator, making the update converge faster if the covariance $\Sigma_n$ is small.

MMSE Estimation of Clean Speech and Noise

Once the noise model has been constructed, an estimate of the noise for each frame is computed as:

$$\hat{n}_i = \int n p(n|y_t) dn = \sum_i p(i|y_t) \int n p(n|y_t, i) dn = \sum_i p(i|y_t) \mu_{n|y}(i) \quad \text{EQ. 27}$$

Similarly, the estimate of the clean speech signal is computed as:

$$\hat{x}_1 = \sum_i p(i|y_t) \mu_{x|y}(i) \quad \text{EQ. 28}$$

Simplified Determination of Model Parameters and Estimates of Clean Speech and Noise Under one embodiment, the ML computations and the noise and clean speech estimations described above are simplified. A flow diagram of the simplified technique is shown in FIG. 5.

Figure 5:
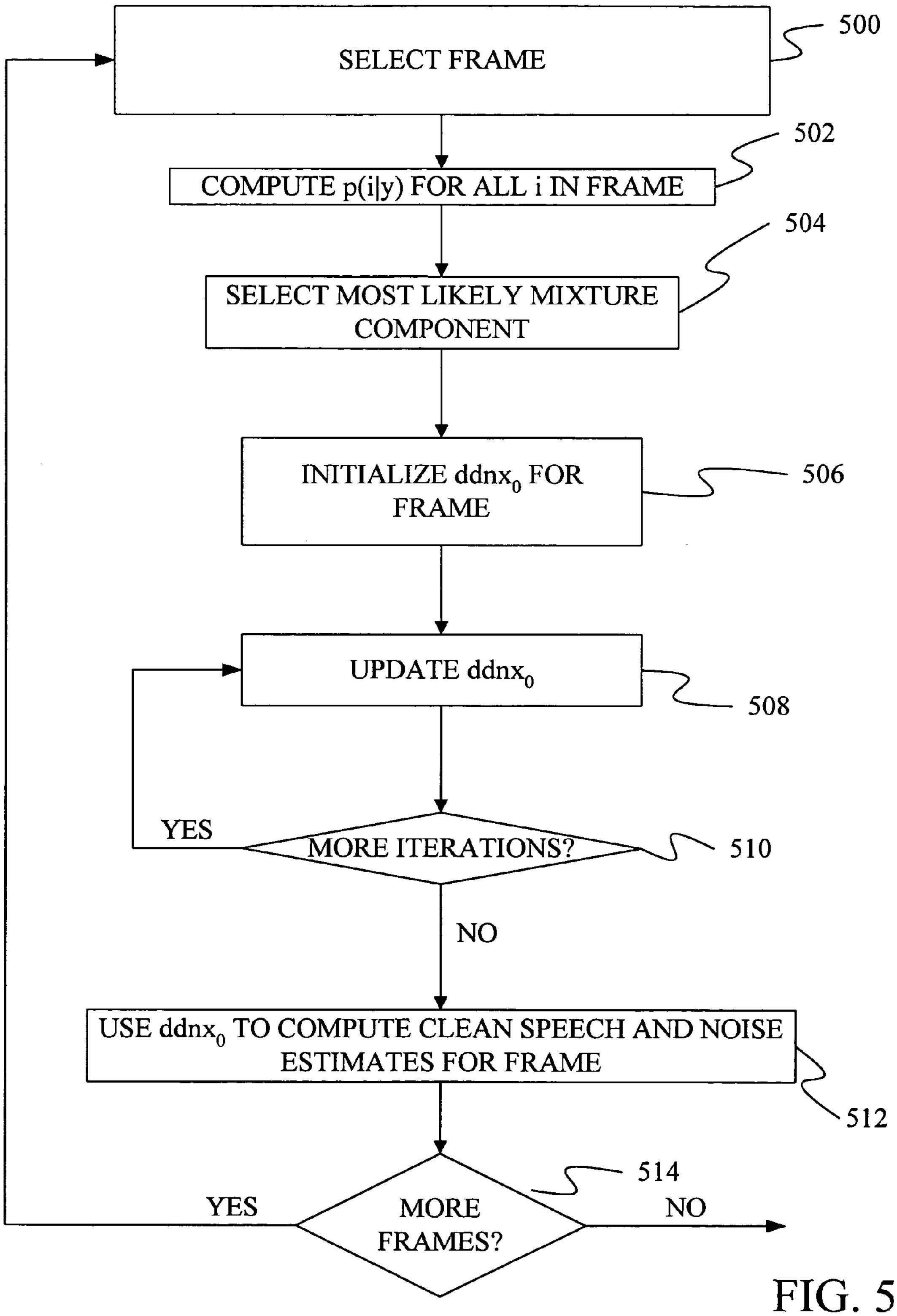
FIG. 5 is a flow diagram of a simplified method for determining clean speech and noise estimates under one embodiment of the present invention.

At step 500 of FIG. 5, an observation vector for a frame is selected. At step 502, the posterior probability $p(i|y_t)$ for each mixture component i is computed. The mixture component with the highest posterior probability is then selected at step 504. Instead of using all of the mixture components in computing the noise estimate, only the selected mixture component is used.

At step 506, a variable $ddnx_0$ is initialized for the frame. This variable is defined as:

$$ddnx_0 = (n_0 - x_0(i)) - (m_n - m_x(i)) \quad \text{EQ. 29}$$

However, it is not computed explicitly using this definition.

For the first frame, $ddnx_0$ is initialized to zero. For each subsequent frame, the initial value for $ddnx_0$ is set to the value in the past frame plus the difference between the mean of the posterior of the selected mixture component in the current frame and the mean of the posterior of the selected mixture component in the past frame. Note that different mixture components may be selected in different frames.

After $ddnx_0$ has been initialized, it is iteratively updated at steps 508 and 510 using an update equation of:

$$ddnx_0 = (\Sigma_y(i))^{-1}((I - G_0)\Sigma_n - G_0\Sigma_x(i))(y - \mu_y(i)) \quad \text{EQ. 30}$$

After a desired number of iterations have been performed at step 510 (in one embodiment four iterations are used), the process continues at step 512 where the value for $ddnx_0$ is used to compute the clean speech and noise estimates for the frame according to the above equations, where $G_0$ can be computed from $ddnx_0$ according to equation 31, and equation 14 is modified according to equation 32.

$$G_0 = C \frac{1}{\exp(C^{-1}(ddnx_0 + (m_n - m_x(i)))) + 1} C^{-1} \quad \text{EQ. 31}$$

$$\mu_y(i) = m_x(i) + C\log(1 + \exp(C^{-1}(ddnx_0 + (m_n - m_x(i))))) - (I - G_0)ddnx_0 \quad \text{EQ. 32}$$

After the clean speech and noise estimates have been determined for the frame, the method determines if there are more frames to process at step 514. If there are more frames, the method returns to step 500 to select the next frame. If the last frame has been processed, the method ends after step 514.

Although the present invention has been described with reference to particular embodiments, workers skilled in the art will recognize that changes may be made in form and detail without departing from the spirit and scope of the invention.

What is claimed is:

1. A method of identifying a clean speech signal from a noisy speech signal, the method comprising:

receiving a plurality of observation vectors each representing a separate frame of a noisy speech signal;

a processor using a prior model of clean speech and the plurality of observation vectors to determine a mean and covariance for a distribution of noise values;

a processor using the mean and covariance for the distribution of noise values, a respective observation vector, and the prior model of clean speech to compute an estimate for a clean speech value for each frame;

a processor using the mean and covariance for the distribution of noise values and a respective observation vector to compute an estimate for a noise value for each frame, where each estimate for the noise value is separate from the mean of noise values;

a processor converting the clean speech value and the noise value for each frame into the spectral domain to form clean speech spectral values and noise spectral values;

a processor smoothing the clean speech spectral values over time and frequency to form smoothed clean speech spectral values, wherein smoothing over time involves smoothing clean speech spectral values for a frequency across different frames;

a processor smoothing the noise spectral values over time and frequency to form smoothed noise spectral values;

a processor using the smoothed clean speech spectral values and the smoothed noise spectral values to set a gain for a filter for a frame wherein setting a gain for a filter for a frame comprises defining the gain as a ratio with denominator of the ratio being the sum of the smoothed clean speech spectral value for the frame and the smoothed noise spectral value for the frame and a numerator of the ratio that is a function of the smoothed clean speech spectral value for the frame and the smoothed noise spectral value for the frame; and applying the observation vector to the filter to produce a filtered clean speech vector representing a segment of a clean speech signal.

2. The method of claim 1 wherein determining a mean of the distribution of noise values comprises at each of a set of iterations, updating the mean by adding a value to the value of the mean in a past iteration, the value added to the mean not being computed based on a product formed between a covariance of the noise distribution and a difference between the observation vector and another value.

3. The method of claim 1 wherein defining the gain as a ratio comprises defining the ratio such that it is guaranteed to be positive if the clean speech value and the noise value are positive.

4. The method of claim 1 wherein the observation vector has been formed without applying a frequency-based transform.

* * * * *